United States Patent [19]

Gifford et al.

[11] Patent Number: 4,917,157

[45] Date of Patent: Apr. 17, 1990

[54] VEHICLE TANK VAPOR VENT VALVE ASSEMBLY

[75] Inventors: William E. Gifford, Hemlock; Carl H. Sherwood, Brockport; Charles H. Covert, Manchester; Kenneth W. Turner, Webster, all of N.Y.

[73] Assignee: General Motors Corporation, Detroit, Mich.

[21] Appl. No.: 316,002

[22] Filed: Feb. 27, 1989

[51] Int. Cl.[4] .............................................. B65B 31/06
[52] U.S. Cl. .......................................... 141/59; 141/46; 141/302; 220/85 VR; 220/85 VS; 123/519; 55/387; 137/588
[58] Field of Search ................................ 141/59, 44-46, 141/302; 220/86 R, 85 VR, 85 VS; 123/516-519; 55/387, 168; 137/587, 588, 589

[56] References Cited

U.S. PATENT DOCUMENTS

| | | | |
|---|---|---|---|
| 3,728,846 | 4/1973 | Nilsson | 55/159 |
| 4,625,777 | 12/1986 | Schmidt | 141/286 |
| 4,630,749 | 12/1986 | Armstrong et al. | 220/86 R |
| 4,651,889 | 3/1987 | Uranishi et al. | 220/85 VR |
| 4,706,708 | 11/1987 | Fornuto et al. | 137/588 |
| 4,707,164 | 11/1987 | Harris | 55/168 |
| 4,714,172 | 12/1987 | Morris | 220/86 R |
| 4,715,509 | 12/1987 | Ito et al. | 220/86 R |
| 4,719,949 | 6/1988 | Mears | 141/301 |
| 4,724,861 | 2/1988 | Covert et al. | 137/202 |
| 4,742,809 | 5/1988 | Ito et al. | 123/519 |
| 4,747,508 | 5/1988 | Sherwood | 220/86 R |
| 4,762,156 | 8/1988 | Rich | 141/46 |
| 4,765,504 | 8/1988 | Sherwood et al. | 220/86 R |
| 4,795,050 | 1/1989 | Smith et al. | 220/85 VR |
| 4,798,306 | 1/1989 | Giacomazzi et al. | 220/86 R |
| 4,809,865 | 3/1989 | Mori et al. | 220/86 R |
| 4,816,045 | 3/1989 | Szalga et al. | 55/168 |

Primary Examiner—Ernest G. Cusick
Attorney, Agent, or Firm—Patrick M. Griffin

[57] ABSTRACT

A tank vapor vent valve assembly uses a spring loaded sealing flapper door located below a normally open float chamber. The flapper door spring is specifically designed to open when the tank pressure falls, allowing make up air to pull the flapper door down and draw in make up air through the canister inlet.

2 Claims, 3 Drawing Sheets

1

VEHICLE TANK VAPOR VENT VALVE ASSEMBLY

BACKGROUND OF THE INVENTION

1. Field of the Invention

This invention relates to vehicle fuel tanks in general, and specifically to a tank vapor vent valve assembly.

2. Description of the Related Art

When closed, vehicle fuel tanks are subject to positive pressure fluctuations, due to the normal or diurnal generation of fuel vapor from the liquid fuel as it sits in the tank, and due to temperature increases. They are also subject to negative pressure fluctuations, due to temperature decreases, and due to liquid fuel being pumped out. The tank pressure must be kept within a normal range to assure proper operation. The normal positive pressure fluctuations caused by diurnal vapors, which used to be controlled simply by venting to atmosphere, are now controlled by routing to a vapor storage canister. Higher than normal positive pressure fluctuations, should they occur, are controlled by a pressure relief valve. Negative pressure fluctuations are generally controlled by a separate valve on the gas cap or tank, which inlets air to the tank below a certain threshold negative tank pressure. In the future, vehicles may also require tank vapor vent valve assemblies, often referred to as TVVA's, to also recover the fuel vapors displaced from the tank as it is filled, which are now generally just vented to atmosphere. Since this will require substantial additional structure on the vehicle, it would be desirable, if possible, to combine at least some of the tank pressure control functions with the TVVA structure, so as to minimize expense and complexity.

SUMMARY OF THE INVENTION

The invention provides a vapor vent valve assembly that also provides control of the negative fuel tank pressure fluctuation. The preferred embodiment comprises a unitary structure, and also includes a valve to control above normal positive pressure fluctuations.

In the embodiment disclosed, a tubular plastic body or housing that fits into the top of the tank filler pipe as a unit serves as the basic structural framework for the invention, and is closed by a conventional cap. A spring loaded flapper door mounted inside the housing is normally closed, but can be opened by insertion of a conventional filler nozzle. The flapper door is spring loaded closed against an annular seat so as to create a blocking seal. However, the spring force is weak enough that the flapper door can open if the tank pressure falls sufficiently below atmosphere, and if the upper side of the flapper door is exposed to atmosphere, which it indirectly is.

Spaced above the flapper door and seat is an annular seal that wipes the outside of the nozzle when it is inserted. The nozzle is smaller than the seat, through which it also passes. A passage molded integrally within the housing opens from a location between the upper surface of the flapper door and the nozzle seal to a float chamber on the side of the housing. The float chamber contains a buoyant overfill protection float that is normally in a down position, below an open fitting at the top of the float chamber. A vapor vent line runs from the float chamber fitting to a vapor storage canister, which has an outside air inlet. Thus, during fuel fill, displaced tank vapors can pass through the clearance between the seat and nozzle, but are blocked by the nozzle seal, and so forced out the side through the passage to the float chamber and canister. When the nozzle is removed and the cap replaced, normal positive pressure vapors cannot pass the closed flapper door to reach the passage. Greater than normal positive pressure vapors can escape through a poppet valve that is conveniently mounted in the housing. Negative pressure in the tank can suck air through the canister air inlet, through the vapor vent line to the float chamber, past the float and to the upper side of the flapper door, which will open. Thus, negative pressure fluctuations are controlled with no additional structure.

It is, therefore, a general object of the invention to provide a tank vapor vent valve assembly, or TVVA, that controls the pressure fluctuations in the fuel tank as well as recovering fuel fill vapors.

It is another object of the invention to provide such a TVVA that controls at least the negative tank pressure fluctuations with the same structure that also recovers the fuel fill vapors.

It is another object of the invention to provide a TVVA that has a sealing flapper door that is normally biased closed, so as to block vapor loss, but which can be opened either by the fuel nozzle or by the negative pressure fluctuations in the tank.

BRIEF DESCRIPTION OF THE DRAWINGS

These and other objects and features of the invention will appear from the following written description, and from the drawings, in which.

DESCRIPTION OF THE PREFERRED EMBODIMENT

Figure 1:
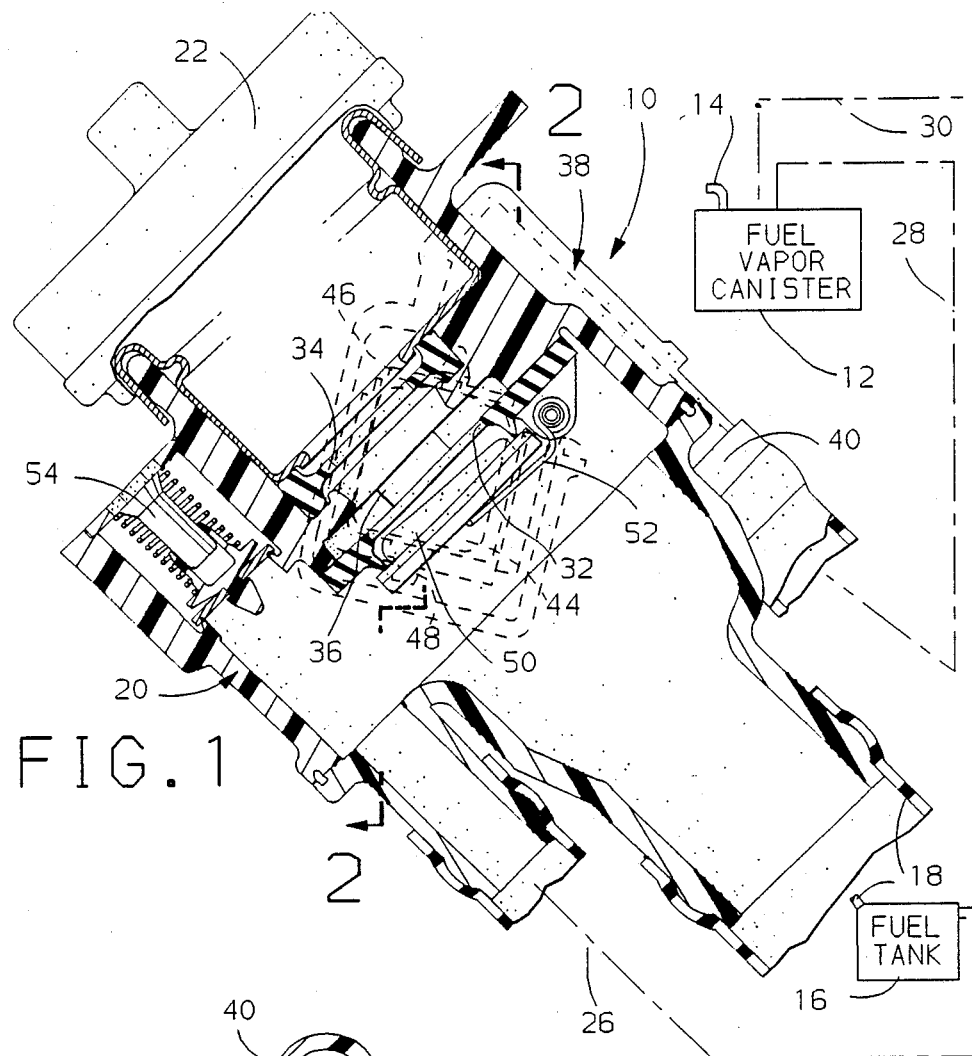
FIG. 1 is a cross sectional view of a preferred embodiment of a TVVA assembly incorporating the invention, and showing a fuel tank and fuel vapor storage canister schematically, at a normal positive tank pressure.
Figure 3:
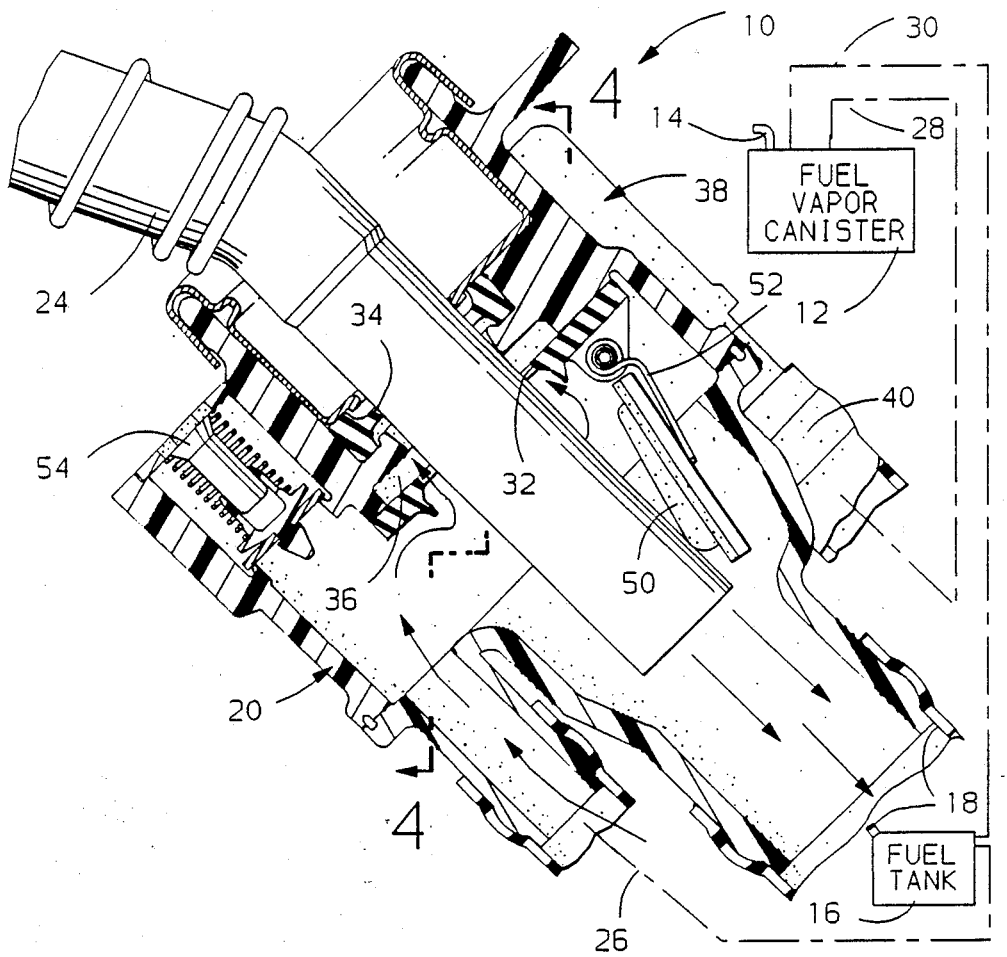
FIG. 3 is view like FIG. 1, but showing fuel fill.

Referring first to FIGS. 1 and 3, a preferred embodiment of a tank vent valve assembly, or TVVA, incorporating the invention is indicated generally at 10. TVVA 10 is part of a total fuel vapor recovery system, which also includes a fuel vapor storage canister 12 of the type that has an outside air inlet 14, and a fuel tank 16 with a filler pipe 18. TVVA 10 includes a generally tubular housing or body 20, which serves as a foundation for several other components described below. The lower end of body 20 plugs into the top of filler pipe 18, while the upper end is threaded to receive a conventional, removable gas cap 22, thus providing a unitary filler neck assembly for filler pipe 18. With cap 22 removed, a conventional fuel nozzle 24 can e inserted. A fuel tank vent line 26 runs from the top of tank 16 into one side of body 20, and a vapor vent line 28 runs from the other side of body 20 to canister 12. A restricted diurnal loss vent line 30 runs from the top of tank 16 to canister 12 as well. The components described thus far operate basically conventionally. Normal positive pressure fluctuations in tank 16, caused by diurnal vaporization, are controlled by venting to canister 12 through line 30. Positive pressure increases that would otherwise be caused in tank 16 as fuel entered from nozzle 24 are vented from tank 16, through tank vent line 26, through body 20 and then through vapor vent line 28 to canister 12, in a manner more fully described below. Negative tank pressure fluctuations, and higher than normal positive pressure fluctuations, are controlled by additional structure described below.

Still referring to FIGS. 1 and 2, body 20 is molded with an integral, internal annular seat 32 located below and coaxial to cap 22. Seat 32 is large enough to receive nozzle 24 therethrough with some clearance. Located above seat 32 and below cap 22, and coaxial to each, is a nozzle engaging seal 34. Also molded integrally with the interior of body 20 is a passage 36, which runs laterally through body 20 from a point between seat 32 and seal into the bottom of a float chamber 38 on the side of body 20. Float chamber 38 has an open fitting 40 at the top thereof, the outer end of which connects to vapor vent line 28. Inside float chamber 38, a sleeve shaped interior wall 42, which is spaced from the inside surface of float chamber 38, slidably supports a cylindrical hollow float 44. Float 44 has a sealing washer 46 at the top, normally spaced below the inner end of fitting 40. A pressure tube 48 opens through sleeve 42 to the bottom of float 44, for a purpose described below. A flapper door 50 is pivoted to the inside of body 20 at a location below passage 36 and seat 32. Door 50 is biased about its pivot by a torsion spring 52 so that its upper side normally seals against seat 32. Spring 52 is sufficiently weak, however, that the pressure with which it holds door 50 closed can be overcome by the force differential that would be created when the upper side of door 50 is open to atmospheric pressure while the underside of door 50 is exposed to the expected negative tank pressure. Finally, a poppet valve 54 is fixed to body 20, which is set to open at a positive pressure above that which would be normally expected within tank 16. The structures just described, and their relative location to one another, cooperate to control the various expected pressure fluctuations in tank 16, as will be described next.

Figure 4:
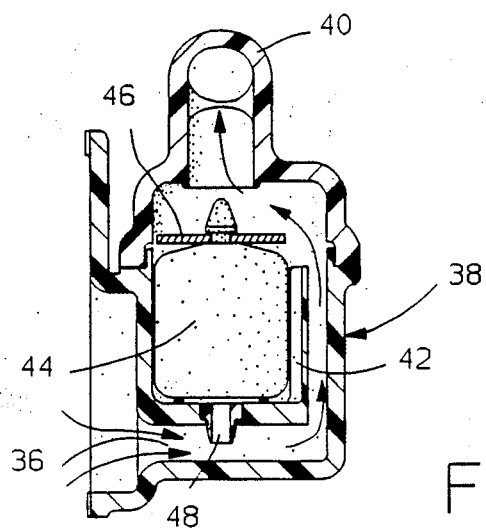
FIG. 4 is a view like FIG. 2, but showing the flow of vapors out during fill.

Referring next to FIGS. 3 and 4, when cap 22 is removed and nozzle 24 inserted to begin fuel fill, flapper door 50 is easily opened. The liquid fuel entering tank 16, shown by the down arrows, displaces an equal volume of vapor from tank 16. The displaced tank vapors exit tank 16 through tank vent line 26, shown by the up arrows, and enter body 20, flowing between nozzle 24 and annular seat 32 into passage 36. Seal 34 prevents exit to atmosphere. From there, the vapors are forced into float chamber 38, and rush past pressure tube 48, over the outside of sleeve 42 and up through the open fitting 40 to the vapor vent line 28. In the particular embodiment disclosed, the force of the vapors rushing past pressure tube 48 creates a suction that assures that float 44 stays in a down position, so that fitting 40 stays open. However, any design TVVA in which the overfill protection float stays down is suitable. The free exit of fuel fill vapors assures that the vapor pressure in tank 16 does not rise unacceptably during fill. As is conventional, in the case of overfill, liquid fuel will buoy float 44 up, bringing washer 46 against fitting 40 to block vapor vent line 28. The same structure that recovers fuel fill vapors cooperates to control potential pressure fluctuations in tank 16 at times other than during fuel fill.

Figure 2:
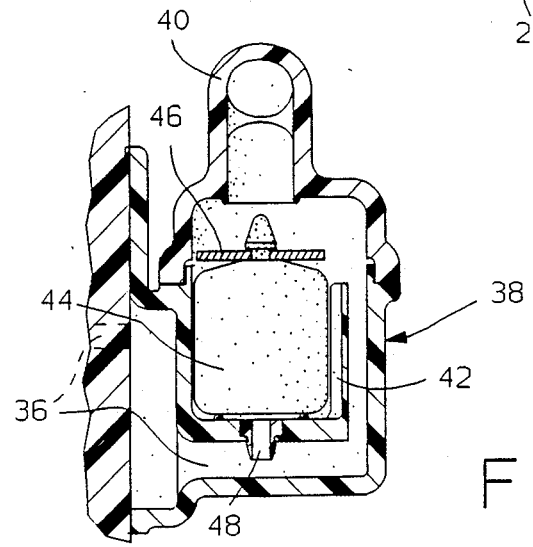
FIG. 2 is a cross section view of the, float chamber taken along the line 2—2 of FIG. 1.

Referring next to FIGS. 1 and 2, when the gas cap 22 is on, the pressure in tank 16 may fluctuate up or down, depending on temperature and other conditions. If it fluctuates within a normal range, any vapors entering body 20, either through filler pipe 18 or through tank vent line 26, will be unable to escape t atmosphere, since the flapper door 50 blocks seat 32. Since flapper door 50 is located below the passage 36 to float chamber 38, there is no need to provide any mechanical means to hold float up against seat 40 to block vapor access to vapor vent line 28. Of course, diurnal vapors can still escape to canister 12 through diurnal line 30, but that line is restricted so as to prevent much loss. A higher than normal positive vapor pressure can open poppet valve 54, but that would be rare. Poppet valve 54 could also serve to release liquid fuel overfill, in case the nozzle 24 should fail to turn off, which would exit in a location that would be immediately seen by the operator. The same arrangement of components that prevents vapor loss from normal positive vapor pressures also allows negative tank pressure fluctuations to equalize, as described next.

Figure 5:
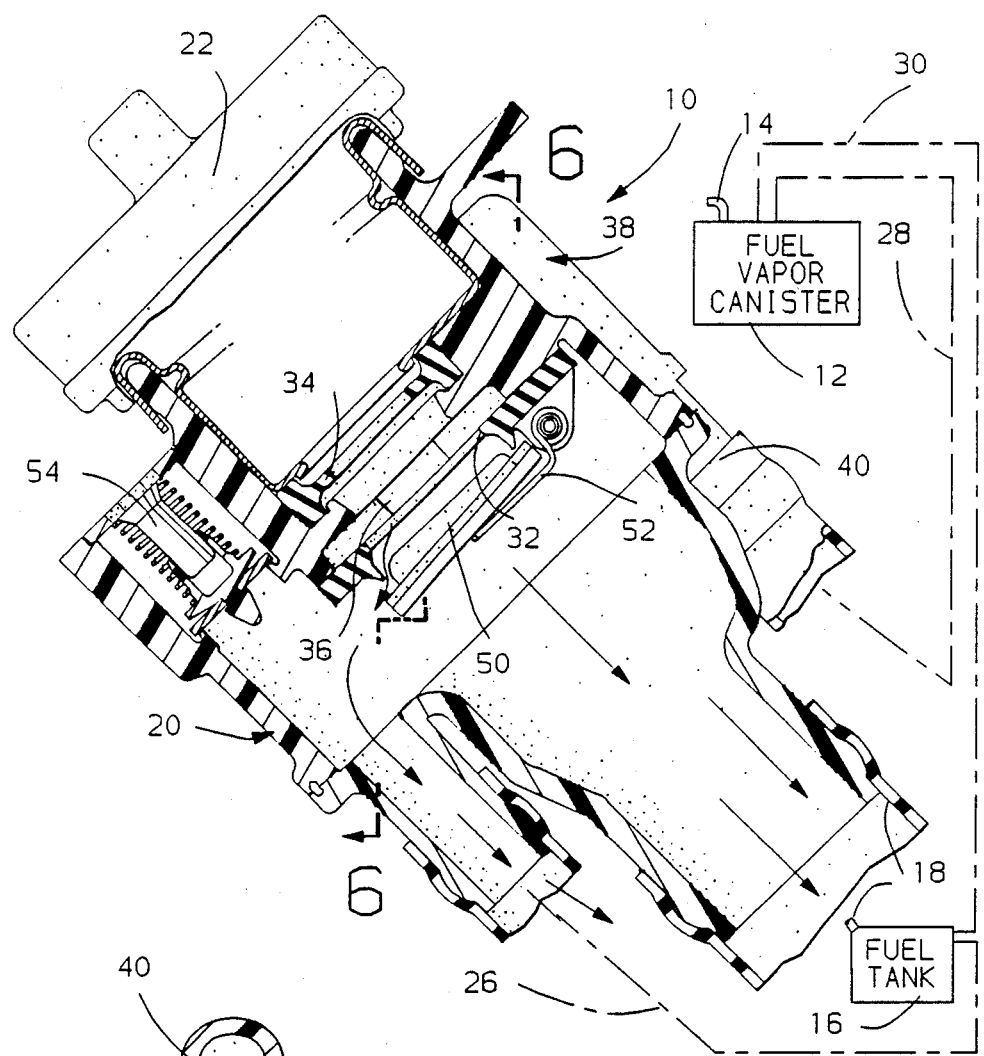
FIG. 5 is a view like 1, but showing a negative tank pressure fluctuation.
Figure 6:
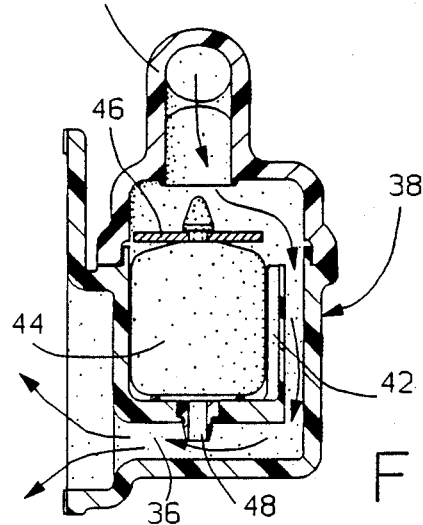
FIG. 6 is like FIG. 4, but showing outside air drawn in from the canister.

Referring next to FIGS. 5 and 6, the condition of a negative tank pressure fluctuation is illustrated. Since float 44 can stay in the down position, the upper side of flapper door 50 sees atmospheric pressure through the canister air inlet 14 and the vapor vent line 28. The underside of flapper door 50 sees the lower tank pressure, and spring 52 is weak enough to allow the force differential created to pull flapper door 50 downwardly about its pivot, allowing outside air to be drawn in to relieve the negative tank pressure. The air flow in is shown by the arrows. So, no extra air inlet is necessary. Door 50 will quickly shut again when the pressure balance changes.

Variations of the preferred embodiment may be made. A tight nozzle seal 34 might not be needed in all cases, especially if there were a close clearance around the inserted nozzle 24, or if there were a liquid seal or trap at the juncture of filler pipe 18 with tank 16. Flapper door 50 could conceivably be in another location other than directly coaxial with and below gas cap 22, so long as it still interrupted the path between tank vent line 26 and float chamber 38 when the gas cap 222 was on, and was still opened somehow to complete that path when nozzle 24 was inserted. The specific location of door 50 is particularly advantageous, however, in that it also serves to block the escape of any so called puff losses when cap 22 is first removed. And, again, any float and float chamber arrangement would work so long as the float normally stayed in a non blocking position relative to the vapor vent line, and so long as the nozzle opened flapper door acted to block the vapor path to the float chamber when the gas cap was on. The various components, such as flapper door, seal, seat, etc, could be mounted inside the top of a basically conventional filler pipe. However, the preferred embodiment, in which the tubular body 20 provides the filler neck for the filler pipe 18, is particularly advantageous, since the seat 32 and passage 36 can be molded integrally right into it, the float chamber 38 can be easily attached to the side, and the whole assembly can be plugged as a unit into the top of the filler pipe 18. Therefore, it will be understood that it is not intended to limit the invention to just the preferred embodiment disclosed.

The embodiments of the invention in which an exclusive property or privilege is claimed are defined as follows:

1. A vapor vent valve assembly for a vehicle of the type that has a vapor storage canister with an outside air inlet and a fuel- tank with a filler pipe that is normally closed and is adapted to receive a fuel nozzle when open, and in which said fuel tank is subject to negative and positive pressure fluctuations when said filler pipe is closed, said vapor vent valve assembly comprising, a downwardly opening sealing flapper door that is normally biased upwardly and closed with a predetermined pressure less than said fuel tank negative pressure fluctuation, but which is adapted to be opened by said fuel nozzle, a float chamber having an open fitting at the top thereof, a vapor vent line running from said fitting to said canister, an overfill prevention float contained within said float chamber which is normally located below said fitting, and, a passage running from a location within said filler pipe above said flapper door into said float chamber, whereby, when said filler pipe is opened and said nozzle inserted to open said flapper door, fuel vapors displaced from said fuel tank may flow freely from said filler pipe to said canister, and when said nozzle is removed and said filler pipe is closed, fuel vapors forced up said filler pipe by a positive fuel tank pressure fluctuation will be prevented from escaping by said normally closed flapper door, while a negative fuel tank pressure fluctuation will pull said flapper door down and open to draw outside air through said canister inlet to relieve said negative tank pressure.

2. A filler neck assembly for a vehicle having a fuel tank with a filler pipe that is filled by a fuel nozzle and a vapor storage canister with an outside air inlet, and in which said fuel tank is subject to negative and positive pressure fluctuations when said filler pipe is closed, comprising, a tubular body having a side and a lower end adapted to fit into said filler pipe and an upper end adapted to have said nozzle inserted thereinto and which is closable by a removable cap, said tubular body further having a generally annular seat located below its upper end adapted to have said nozzle received therethrough with clearance, a resilient annular seal in said tubular body adapted to have said nozzle tightly received therethrough and located between said upper end and said seat, a passage internal to said tubular body located between said seat and seal and opening through said side of said tubular body, a downwardly opening sealing flapper poor pivoted within said tubular body below said seat and normally biased upwardly to engage said seat with a predetermined pressure less than said fuel tank negative pressure fluctuation, a float chamber mounted to said side of said tubular body so that said passage opens into said float chamber, said float chamber further having an open fitting at the top thereof, a vapor vent line running from said fitting to said canister, and, an overfill prevention float contained within said float chamber which is normally located below said fitting, whereby, when said cap is removed and said nozzle inserted into said tubular body, said nozzle passes through said seal and seat and opens said flapper door so that fuel vapors displaced from said fuel tank are blocked from said tubular body upper end by said seal but may flow freely from said filler pipe through said seat to said float chamber and to said canister, and when said nozzle is removed and said filler neck is closed, fuel vapors forced into said filler neck by a positive fuel tank pressure fluctuation will be prevented from escaping by said normally closed flapper door, while a negative fuel tank pressure fluctuation will pull said flapper door down and open to draw outside air through said canister inlet to relieve said negative tank pressure.

* * * * *